United States Patent [19]

Tang

[11] Patent Number: 5,361,158
[45] Date of Patent: Nov. 1, 1994

[54] MULTIPLE SOURCE OPTICAL SCANNER

[75] Inventor: Hong Tang, Duluth, Ga.

[73] Assignee: AT&T Global Information Solutions (FKA NCR Corporation), Dayton, Ohio

[21] Appl. No.: 63,808

[22] Filed: May 20, 1993

Related U.S. Application Data

[62] Division of Ser. No. 944,576, Sep. 14, 1992.

[51] Int. Cl.⁵ .................... G02B 26/08; G06K 7/10
[52] U.S. Cl. ................................ 359/204; 235/467; 250/578.1
[58] Field of Search ............... 359/204, 216–221, 359/900; 250/578.1; 235/463, 467, 462, 470, 472

[56] References Cited

U.S. PATENT DOCUMENTS

| | | | |
|---|---|---|---|
| 4,460,240 | 7/1984 | Hudson | 350/6.8 |
| 4,474,422 | 10/1984 | Kitamura | 350/6.8 |
| 4,561,717 | 12/1985 | Kataoka et al. | 350/6.8 |
| 4,574,197 | 3/1986 | Kliever | 250/334 |
| 4,591,242 | 5/1986 | Broockman et al. | 350/3.71 |
| 4,637,679 | 1/1987 | Funato | 350/6.5 |
| 4,796,961 | 1/1989 | Yamada et al. | 350/6.8 |
| 4,805,974 | 2/1989 | Brueggemann et al. | 350/6.7 |
| 4,939,355 | 7/1990 | Rando et al. | 235/467 |
| 4,962,983 | 10/1990 | Watanabe | 350/6.8 |
| 5,073,702 | 12/1991 | Schuhmacher | 235/467 |
| 5,157,533 | 10/1992 | Hanamoto | 359/204 |
| 5,206,491 | 4/1993 | Katoh et al. | 235/467 |

Primary Examiner—Scott J. Sugarman
Assistant Examiner—James Phan
Attorney, Agent, or Firm—Paul W. Martin

[57] ABSTRACT

A multiple source optical scanner which employs a plurality of scanning light sources to increase the total depth of field and the density of the overall scan pattern. In a first embodiment, the lasers are of different wavelengths and all on. Their individual depths of field are oriented end-to-end or in overlapping fashion. In a second embodiment, the lasers are of the same wavelength and are activated individually in sequence. Both embodiments employ collimating and focusing optics to produce scanning beams, collecting optics to collect light reflected from an article having a bar code label, and processing circuitry for generating signals having information about the articles based upon the intensities of the reflected light. The first embodiment additionally employs filter optics to separate the individual wavelengths of reflected light. Each wavelength of reflected light is processed through its own channel within the processing circuitry. The second embodiment employs modulation and control circuitry to turn each source on and off. A single channel is used for decoding.

5 Claims, 5 Drawing Sheets

MULTIPLE SOURCE OPTICAL SCANNER

This is a division, of application Ser. No. 07/944,576, filed Sept. 14, 1992.

BACKGROUND OF THE INVENTION

The present invention relates to optical scanners and more specifically to a multiple source optical scanner.

Optical scanners are well known for their usefulness in retail checkout and inventory control. Optical scanners generally employ a single laser source, the light from which is collimated and focused to produce a scanning beam. They may additionally employ a mirrored spinner to direct the beam against a plurality of stationary mirrors, and a detector to collect the beam after it is reflected by a bar code label. The pattern produced by such a scanner is characterized by lines oriented at various angles to one another.

Optical scanners require as large a depth of field as possible to minimize the accuracy with which articles must be located over the scanners. Unfortunately, the beam from a single laser source has a limited depth of field due to the nature of light.

Optical scanners also require as dense a scan pattern as possible in order to maximize the chances of a scanner reading a bar code.

Therefore, it would be desirable to provide an optical scanner which produces a pattern density and a depth of field greater than those of single laser source scanners.

SUMMARY OF THE INVENTION

In accordance with the teachings of the present invention, a multiple source optical scanner is provided. A first embodiment of the optical scanner includes a plurality of scanning light sources of different wavelengths, collimating and focusing optics for producing a beam for each source, reflecting optics for aligning each beam in a predetermined direction, a collector for collecting light reflected from a bar code label to be scanned, filter optics for separating the different wavelengths of light, and processing circuitry having a plurality of processing channels for converting the reflected light of each wavelength into electrical signals based upon the intensities of the reflected light. The first embodiment may also include a mirrored spinner and a plurality of pattern mirrors.

It is a feature of the first embodiment that total depth of field and scan pattern density may be determined by the number of sources and the location of the individual depth of fields.

A second embodiment of the optical scanner includes a plurality of scanning light sources of the same wavelength, collimating and focusing optics for producing a beam for each source, reflecting optics for aligning each beam in a predetermined direction, a collector for collecting light reflected from a bar code label to be scanned, and processing circuitry having a single processing channel for converting the reflected light into electrical signals based upon the intensities of the reflected wavelengths. The scanner additionally includes modulation and control circuitry, which turns the sources off and on in sequence. The second embodiment may also include a mirrored spinner and a plurality of pattern mirrors.

It is a feature of the second embodiment that total depth of field and scan pattern density are increased by alternating in time the position of the scan pattern. Unlike the first embodiment, only one processing channel is required. Thus, filter optics is also not necessary.

It is accordingly an object of the present invention to provide a multiple source optical scanner.

It is another object of the present invention to provide a multiple source optical scanner which provides a greater depth of field than a single laser source optical scanner.

It is another object of the present invention to provide a multiple source optical scanner which has a greater pattern density than a single laser source optical scanner.

It is another object of the present invention to provide a multiple source optical scanner whose depth of field and pattern density are made greater than those of a single laser source optical scanner through the addition of one or more additional laser sources.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
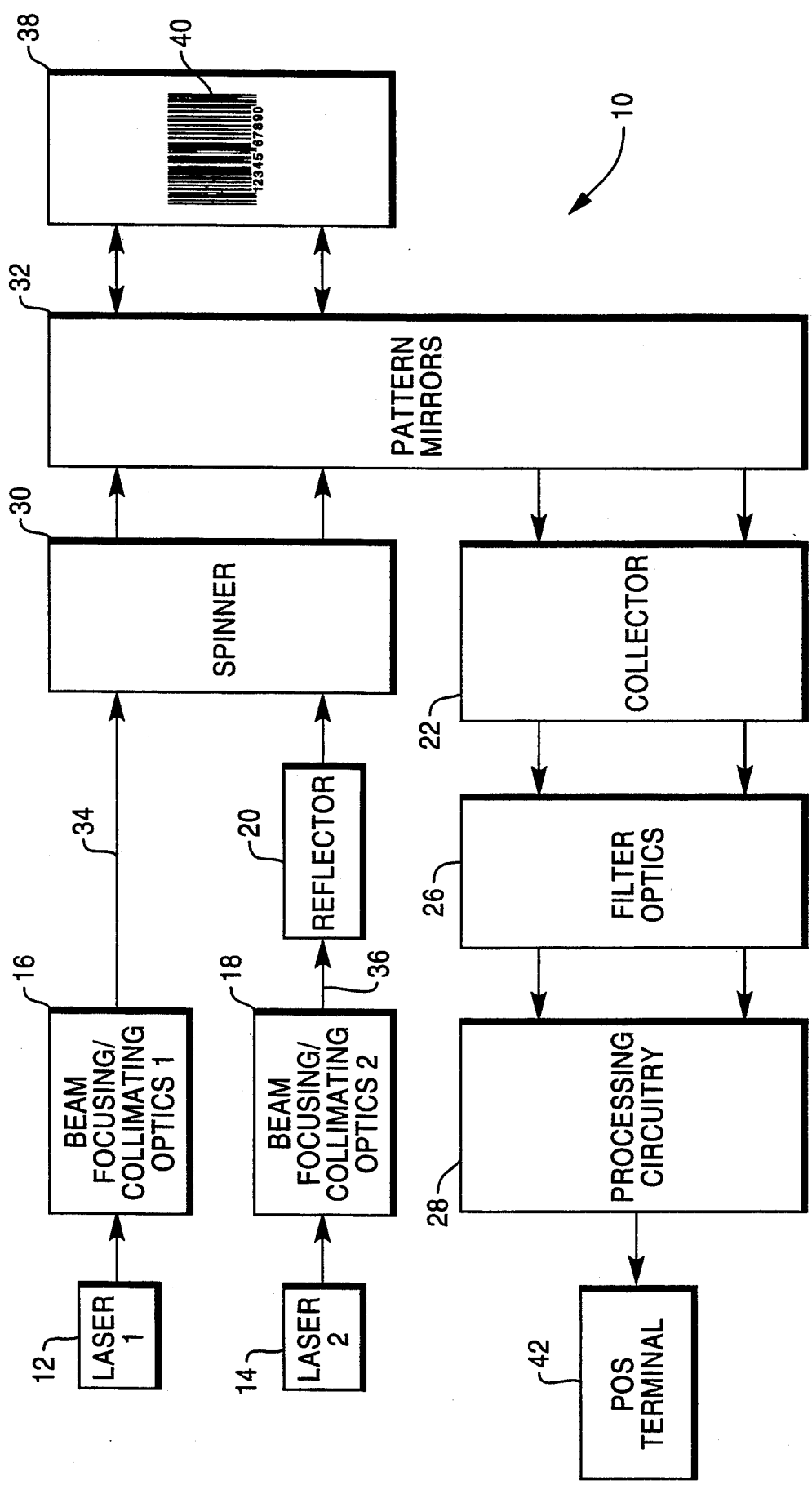
FIG. 1 is a block diagram of a first embodiment of the multiple source optical scanner of the present invention.

Referring now to FIG. 1, a first embodiment of optical scanner 10 of the present invention includes first laser source 12, second laser source 14, first collimating and focusing optics 16, second collimating and focusing optics 18, reflector 20, collector 22, filter optics 26, and processing circuitry 28. Optical scanner 10 may also include spinner 30 and pattern mirrors 32.

Laser sources 12 and 14 are preferably laser diodes. Although two are shown, any number of laser sources are envisioned. Some commercially available laser diodes envisioned for use in the present invention produce light at 635 nanometers (nm), 670 nm, and 780 nm.

First and second beam collimating and focusing optics 16 and 18 produce laser beams 34 and 36 and each may include a focusing lens and an aperture, as known in the art.

Reflector 20 orients beam 36 in a desired direction with respect to beam 34. Preferably, reflector 20 substantially aligns beam 36 with beam 34 to produce two beams propagating in the same direction. Reflector 20 may include a flat mirror.

Collector 22 collects light reflected from an item 38 having a bar code label 40 to be scanned. Collector 22 may include a collecting mirror with a central aperture for passing the outgoing beams 34 and 36.

Filter optics 26 is located between collector 22 and processing circuitry 28 and directs the reflected light of different wavelengths into separate channels corresponding to the wavelengths of laser sources 12 and 14.

Processing circuitry 28 converts the reflected light into electrical signals based upon the intensity of the reflected light and may send the electrical signals to a host terminal, such as a point-of-service (POS) terminal 42.

Where included, spinner 30 and pattern mirrors 32 reflect beams 34 and 36 in a plurality of directions to form a scan pattern.

Figure 2:
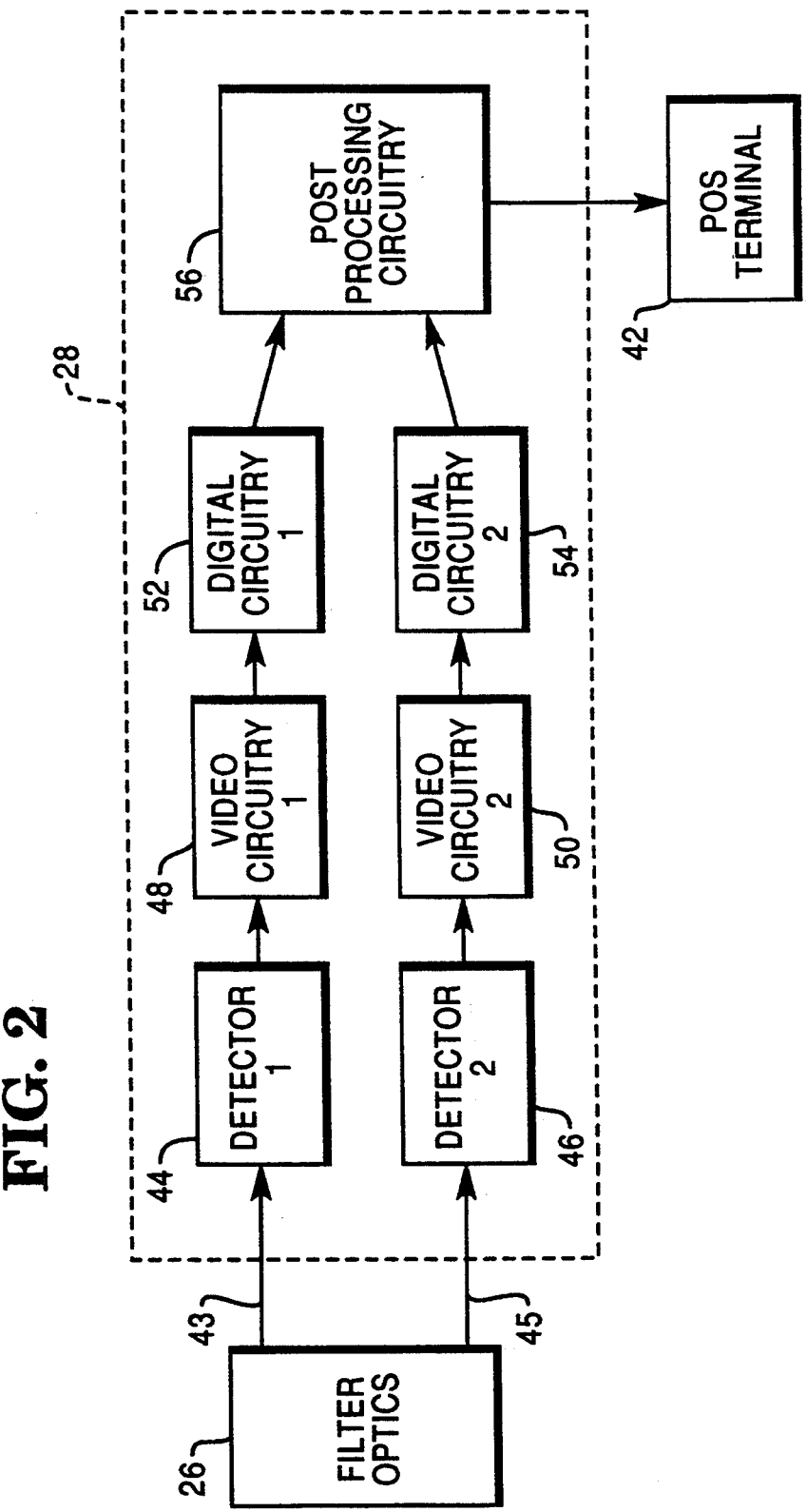
FIG. 2 is a block diagram of the processing circuitry of FIG. 1.

Turning now to FIG. 2, processing circuitry 28 includes two channels 43 and 45 of well known components. Channel 43 includes first detector 44, first video circuitry 48, and first digital circuitry 52 for processing light from laser source 12. Channel 45 includes second detector 46, second video circuitry 50, and second digital circuitry 54 for processing light from laser source 14. Processing circuitry 28 additionally includes post processing circuitry 56.

Light reflected from article 38 is separated into different wavelengths and by filter optics 26.

Detectors 44 and 46 generate electrical signals based on the intensities of the two sources of reflected light.

Video circuitry 48 and 50 provide threshold filtering of noise and amplification of the filtered signal.

Digital circuitry 52 and 54 decode the digital bar code information into numbers.

Post processing circuitry 56 determines which one or both of beams 34 and 36 produced a valid read and generates a signal containing the decoded item and price information to terminal 42.

Figure 3:
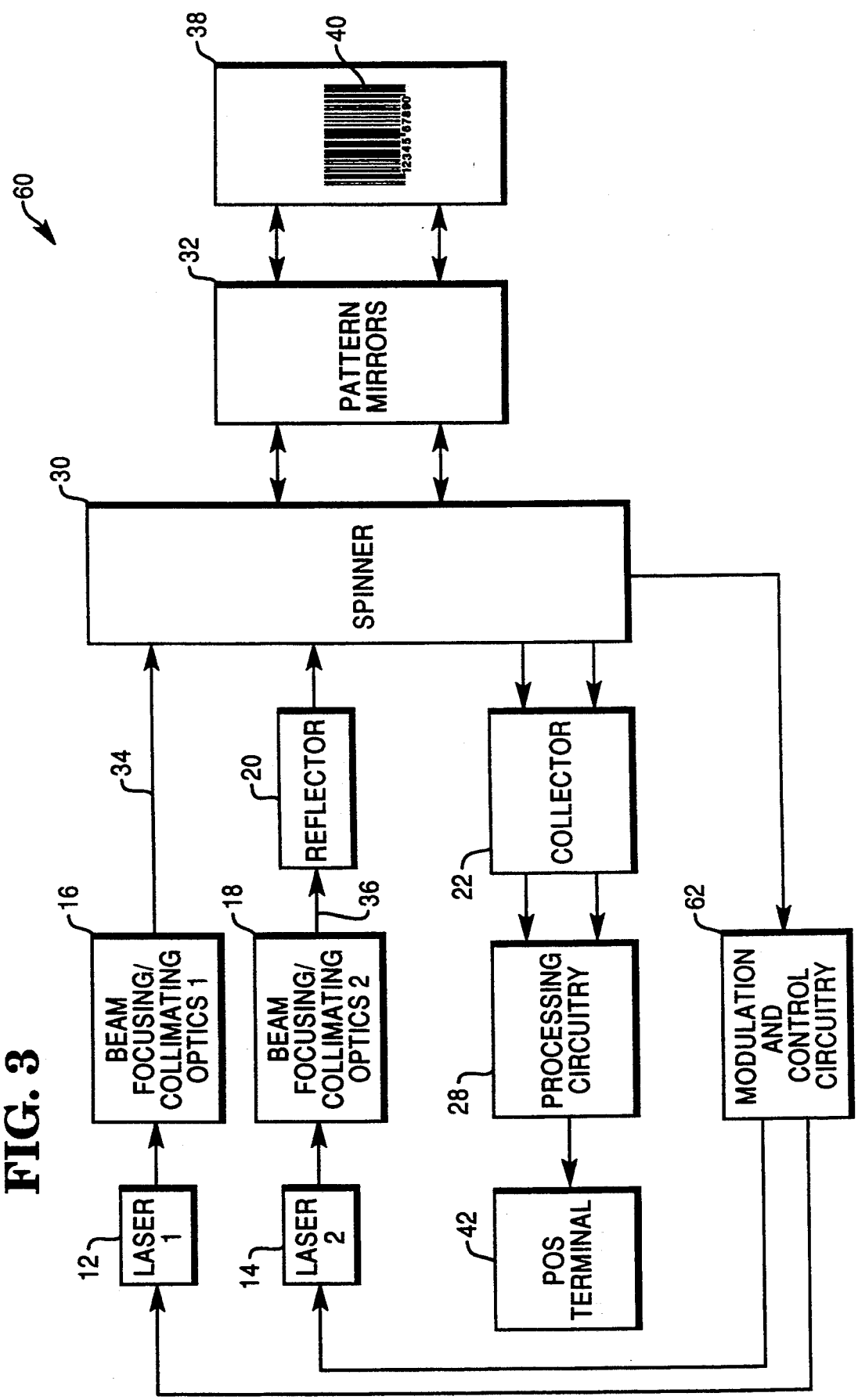
FIG. 3 is a block diagram of a second embodiment of the multiple source optical scanner of the present invention.

Referring now to FIG. 3, a second embodiment 60 of the optical scanner of the present invention is shown. Like scanner 10, scanner 60 includes first laser source 12, second laser source 14, first collimating and focusing optics 16, second collimating and focusing optics 18, reflector 20, collector 22, and processing circuitry 28. Preferably, laser sources 12 and 14 emit light at the same wavelength. Optical scanner 60 may also include spinner 30 and pattern mirrors 32.

Scanner 60 additionally includes modulation and control circuitry 62, which turns laser sources 12 and 14 off and on in alternating fashion.

Advantageously, scanner 60 provides a cheaper option than scanner 60 because it does not require filter optics 26, nor does it require separate channels 43 and 45 within processing circuitry 28.

Figure 4:
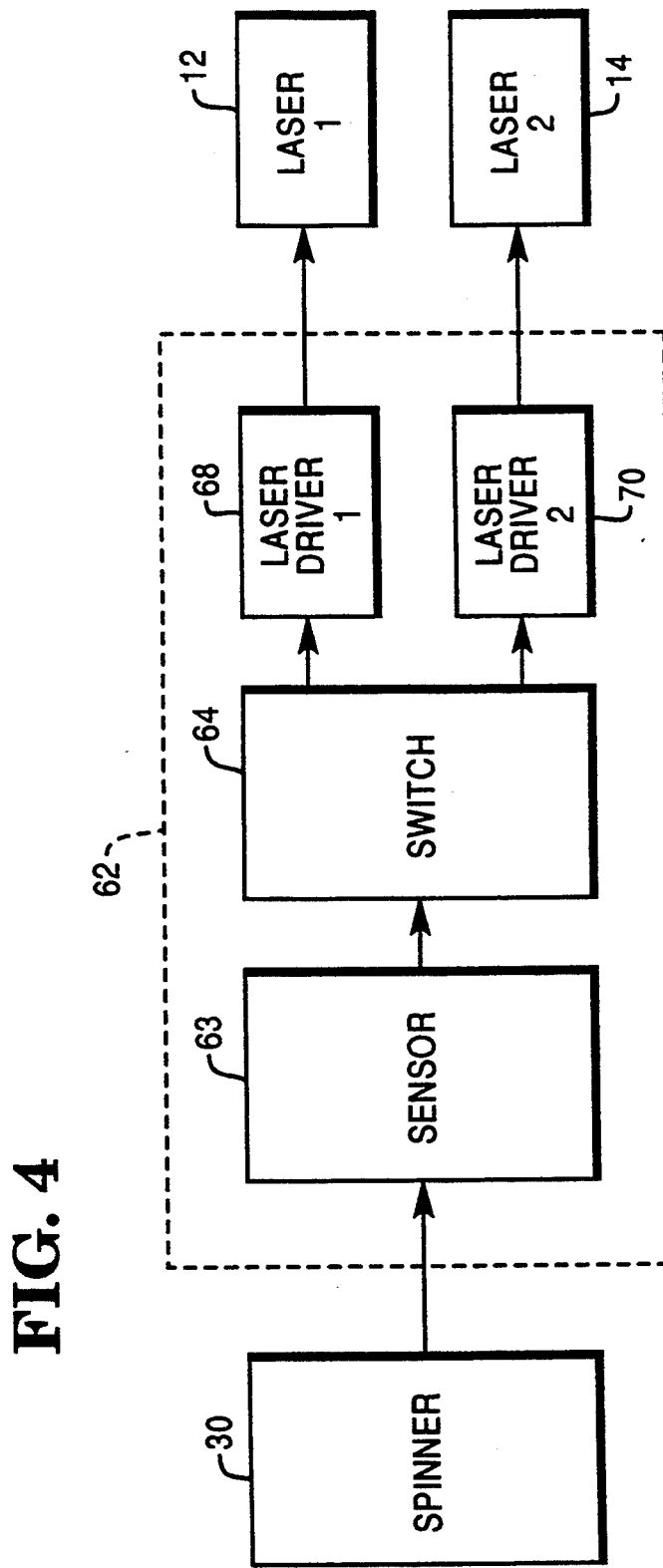
FIG. 4 is a block diagram of the modulation and control circuitry of FIG. 3.

Turning now to FIG. 4, modulation and control circuitry 62 includes a sensor 63 and an electronic switch 64. Switch 64 senses the position of spinner 30 and generates a signal for activating switch 64. Switch 64 activates one of laser sources 12 and 14 at a time, in alternating fashion, through drivers 68 and 70. Preferably, sensor 63 is a Hall sensor, known in the art.

Figure 5:
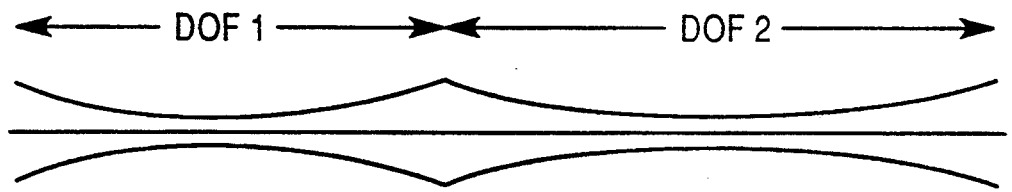
FIG. 5 is a view of two depths of field arranged end to end.
Figure 6:
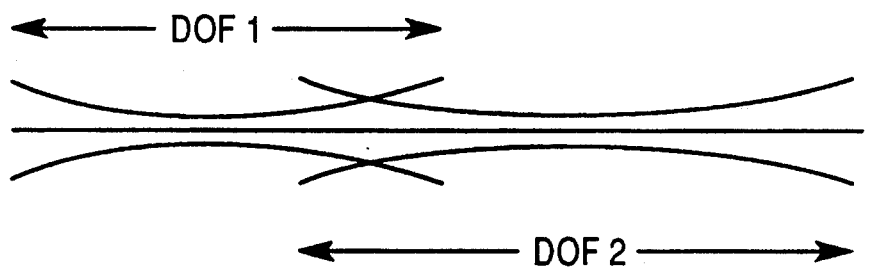
FIG. 6 is a view of two depths of field partially overlapping.
Figure 7:
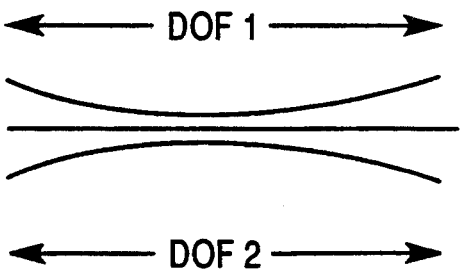
FIG. 7 is a view of two depths of field totally overlapping.

Referring now to FIGS. 5-7, the advantages associated with the use of multiple laser sources is shown. In FIG. 5, first depth of field DOF1, associated with laser source 12, and second depth of field DOF2, associated with laser source 14, are arranged end to end to produce an overall depth of field equal to the sum of depth of fields DOF1 and DOF2. Scanner 10 produces both depths of field DOF1 and DOF2 at the same time, while scanner 60 produces them in alternating fashion in time.

In FIG. 6, depth of field DOF1 and depth of field DOF2 partially overlap to produce an increased depth of field and a higher pattern density in the area of overlap. Scanner 10 produces both depths of field DOF1 and DOF2 at the same time, while scanner 60 produces them in alternating fashion in time.

In FIG. 7, depth of field DOF1 and depth of field DOF2 overlap to produce a scan pattern more dense than either depth of fields DOF1 and DOF2 alone. Thus multiple laser sources may be used to increase the probability of capturing bar code information. Scanner 10 produces both depths of field DOF1 and DOF2 at the same time, while scanner 60 produces them in alternating fashion in time.

Although the present invention has been described with particular reference to certain preferred embodiments thereof, variations and modifications of the present invention can be effected within the spirit and scope of the following claims.

What is claimed is:

1. An optical scanner comprising:
    a plurality of scanning light sources;
    means for focusing and collimating the light from each light source into a beam, each beam having a characteristic depth of field;
    means for directing the light beams along a predetermined direction;
    means for collecting light reflected from an article having a bar code label to be scanned;
    a motor-driven mirrored spinner for reflecting each beam into a plurality of directions and for directing light reflected from the article to the collecting means;
    modulation means for selectively turning one light source on at a time including sensor means for sensing the orientation of the mirrored spinner, and switching means for coupling one of the laser sources to a power source and decoupling all the others from the power source at the same time for a predetermined position of the mirrored spinner; and
    means for converting the reflected light into electrical signals, having information about the items, based upon the intensity of the reflected light.

2. The optical scanner as recited in claim 1, further comprising a plurality of pattern mirrors for reflecting each beam from the spinner to form a scan pattern and to reflect light from the article to the spinner.

3. A method for scanning an article having a bar code label comprising the steps of:
    providing a plurality of scanning light sources which produce scanning beams, each beam having a characteristic depth of field different from any other beam;
    selectively producing one scanning beam at a time, including the substeps of sensing the position of a mirrored spinner, and switching on one source of scanning light while switching off the other sources of scanning light for predetermined positions of the mirrored spinner; and
    directing each scanning beam towards the mirrored spinner.

4. The method as recited in claim 3, further comprising the steps of
    collecting light reflected from the article; and
    converting the reflected light to electrical signals, having information about the items, based upon the intensity of the reflected light.

5. The method as recited in claim 3, wherein the step of providing comprises the substeps of:
    providing a plurality of laser diodes which produce light at the same wavelength; and
    focusing and collimating the light from each laser diode at a unique depth of field to produce the scanning beams.

* * * * *